(12) United States Patent
Hung et al.

(10) Patent No.: US 8,719,460 B2
(45) Date of Patent: May 6, 2014

(54) ELECTRONIC DEVICE, ELECTRONIC SYSTEM AND METHOD THEREFOR FOR AUTOMATICALLY DETECTING AND IDENTIFYING PERIPHERAL DEVICE

(75) Inventors: Ching-Chung Hung, Taoyuan County (TW); Tsung-Pao Kuan, Taoyuan County (TW); Yu-Peng Lai, Taoyuan County (TW); Chia-Wei Hsu, Taoyuan County (TW); Hsiu-Hung Chou, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 383 days.

(21) Appl. No.: 12/700,824

(22) Filed: Feb. 5, 2010

(65) Prior Publication Data

US 2010/0228893 A1 Sep. 9, 2010

(30) Foreign Application Priority Data

Mar. 3, 2009 (TW) ................... 98106809 A

(51) Int. Cl.
 *G06F 3/00* (2006.01)
 *G06F 11/00* (2006.01)
(52) U.S. Cl.
 USPC ..................... 710/15; 710/19; 713/2
(58) Field of Classification Search
 USPC .......................................................... 710/15
 See application file for complete search history.

(56) References Cited

U.S. PATENT DOCUMENTS 5,514,859 A * 5/1996 Seigel ................... 235/462.15
5,832,244 A * 11/1998 Jolley et al. ............... 710/305
5,948,077 A 9/1999 Choi et al.
6,032,254 A * 2/2000 Kume ............................ 713/2
6,351,809 B1 2/2002 St. Pierre, Jr. et al.

(Continued)

FOREIGN PATENT DOCUMENTS

CN 2598052 Y 1/2004
TW M298175 9/2006

(Continued)

OTHER PUBLICATIONS

"Universal Serial Bus Specification 1.1", Chapter 7.1: Signaling, USB Implementers Forum, Sep. 23, 1998; pp. 107-122, XP-002582286.
Universal Serial Bus Specification; Compaq, Hewlett-Packard, Intel, Lucent, Microsoft, NEC, Philips; Revision 2.0; Apr. 27, 2000; pp. 119-170.
"On-The-Go Supplement to the USB 2.0 Specification," Revision 1.0, Dec. 18, 2011, pp. 1-66.

(Continued)

*Primary Examiner* — Titus Wong
(74) *Attorney, Agent, or Firm* — Birch, Stewart, Kolasch & Birch, LLP

(57) ABSTRACT

The invention provides a method for an electronic device for automatically detecting and identifying a peripheral device. The electronic device comprises a connector having a first pin and a second pin and connects to a peripheral device through the connector. The method comprises the steps of determining whether the peripheral device is connected to the connector; reading a first state of the first pin and the second pin when determining that the peripheral device is connected to the connector; setting a voltage of the first pin to a first voltage level and then reading a second state of the first pin and the second pin; and identifying the peripheral device according to the first state and the second state. The invention also provides an electronic device and an electronic system utilizing the above-mentioned method.

15 Claims, 7 Drawing Sheets

(56) References Cited

U.S. PATENT DOCUMENTS

| | | |
|---|---|---|
| 6,442,734 B1 * | 8/2002 | Hanson et al. ............... 716/136 |
| 6,457,071 B1 * | 9/2002 | Thorland et al. ............... 710/19 |
| 6,633,932 B1 | 10/2003 | Bork et al. |
| 2006/0181241 A1 | 8/2006 | Veselic |
| 2007/0226381 A1 * | 9/2007 | Kuan et al. ............... 710/16 |
| 2008/0084834 A1 | 4/2008 | Stanek |
| 2008/0140887 A1 | 6/2008 | Gallant et al. |
| 2008/0263243 A1 | 10/2008 | Wright et al. |

FOREIGN PATENT DOCUMENTS

| | | |
|---|---|---|
| TW | 200734875 | 9/2007 |
| TW | 200830103 A | 7/2008 |
| WO | WO-94/27224 A1 | 11/1994 |

OTHER PUBLICATIONS

COMPAQ, INTEL, Microsoft and NEC, "Universal Serial Bus Specification," Revision 1.1, Sep. 23, 1998, pp. 1-311.

\* cited by examiner

| Peripheral device | IO1_1 | IO2_1 | IO1_2 | IO2_2 | IO1_3 | IO2_3 |
|---|---|---|---|---|---|---|
| Earphone | 0 | 0 | 0 | 0 | 0 | 0 |
| Speaker | 1 | 0 | 1 | 0 | 1 | 0 |
| Charger | 0 | 0 | 1 | 1 | 1 | 1 |
| Microphone | 0 | 0 | 1 | 0 | 0 | 1 |
| Line-controlled ear phon | 1 | 0 | 1 | 0 | 1 | 1 |
| GPS device | 0 | 1 | 1 | 1 | 0 | 1 |

FIG. 5

ELECTRONIC DEVICE, ELECTRONIC SYSTEM AND METHOD THEREFOR FOR AUTOMATICALLY DETECTING AND IDENTIFYING PERIPHERAL DEVICE

CROSS REFERENCE TO RELATED APPLICATIONS

This Application claims priority of Taiwan Patent Application No. 098106809, filed on Mar. 3, 2009, the entirety of which is incorporated by reference herein.

BACKGROUND OF THE INVENTION

1. Field of the Invention

The invention relates to a method for an electronic device for detecting and identifying a peripheral device, and more particularly to a method for an electronic device for automatically detecting and identifying a peripheral device.

2. Description of the Related Art

Conventional portable electronic devices, such as cell phones or personal digital assistants, identify different peripheral devices via different corresponding connecting ports. For example, a portable electronic device may connect to earphones and chargers via different connecting ports. Given miniaturization demands, decreasing the amount of connecting ports through integration may decrease area required thereof. However, an efficient method for an electronic device for automatically identifying peripheral devices is required for integrated connecting ports.

BRIEF SUMMARY OF THE INVENTION

An embodiment of the disclosure provides a method for an electronic device for automatically detecting and identifying a peripheral device. The electronic device comprises a connector having a first pin and a second pin, and connects to a peripheral device. The method comprises the steps of determining whether the peripheral device is connected to the connector; reading a first state of the first pin and the second pin when determining that the peripheral device is connected to the connector; setting a voltage of the first pin to a first voltage level and then reading a second state of the first pin and the second pin; and identifying the peripheral device according to the first state and the second state.

Another embodiment of the disclosure provides an electronic device capable of automatically detecting and identifying a peripheral device. The electronic device comprises a controller and a connector. The connector comprises a first pin and a second pin coupled to the controller, wherein when the connector is connected to the peripheral device, the controller reads a first state of the first pin and the second pin, and when the controller finishes reading the first state, the controller sets a voltage of the first pin to a first voltage level, reads a second state of the first pin and the second pin, and identifies the peripheral device according to the first state and the second state.

Another embodiment of the disclosure provides an electronic system. The system comprises a peripheral device and an electronic device. The peripheral device comprises a third pin and a fourth pin. The electronic device comprises a controller and a connector. The connector comprises a first pin and a second pin coupled to the controller, wherein the electronic device is connected to the peripheral device via the connector. When the electronic device is coupled to the peripheral device, the first pin and the second pin are respectively coupled to the third pin and the fourth pin, and the controller reads a first state of the first pin and the second pin. When the controller finishes reading the first state, the controller sets a voltage of the first pin to a first voltage level, reads a second state of the first pin and the second pin, and identifies the peripheral device according to the first state and the second state.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein:

FIG. 5 is a table showing identification data with corresponding devices shown in FIGS. 4a to 4f.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
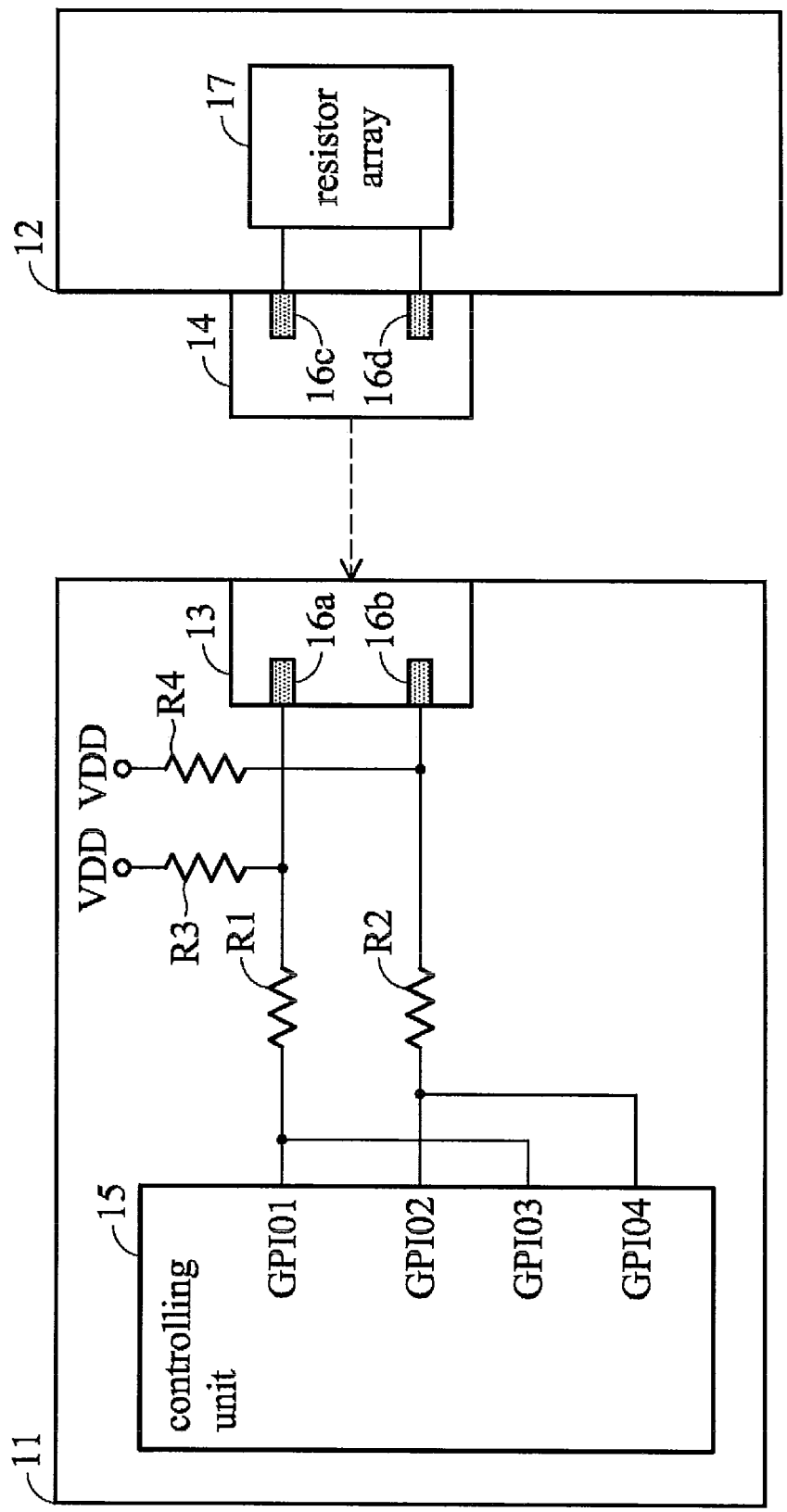
FIG. 1 is a block diagram of an electronic system capable of automatically identifying a peripheral device according to the present invention.

FIG. 1 is a block diagram of an electronic system capable of automatically identifying a peripheral device according to the present invention. The electronic system comprises an electronic device 11 and a peripheral device 12. The electronic device 11 comprises a controlling unit 15 and female connector 13, wherein the controlling unit 15 may be a central processing unit (CPU), micro-processor, micro-controller or other similar element, and the female connector 13 may be the female connector or male connector of any kind of connector. This embodiment is illustrated with the female connector 13, but does not limit the invention thereto. The female connector 13 comprises a first pin 16a and a second pin 16b, and when the peripheral device 12 connects to the female connector 13 via its male connector 14, the first pin 16a and the second pin 16b are respectively electrically connected to the third pin 16c and the fourth pin 16d of the male connector 14. The first pin 16a is connected to the GPIO1 of the controlling unit 15 via the resistor R1 and connected to the voltage VDD via the resistor R3. GPIO is the abbreviation for general purpose input/output. The second pin 16b is connected to the GPIO2 of the controlling unit 15 via the resistor R2 and connected to the voltage VDD via the resistor R4. When the female connector 13 is not connected to any peripheral device, the voltages of the GPIO1 and GPIO2 are both high voltage levels, i.e., logic level 1. Thus, the initial state of the first pin 16a and the second pin 16b is set as [11]. In this embodiment, the initial state of the first pin 16a and the second pin 16b is [11]; however, in other embodiment, the initial state of the first pin 16a and the second pin 16b can be set as [00] by grounding the resistors R3 and R4 and providing the voltage VDD from the peripheral device 12 when the peripheral device 12 is not connected to the electronic device 11. In this embodiment, the resistance of the resistors R1 and R2 is 1KΩ, and the resistance of the resistors R3 and R4 is 100KΩ.

The peripheral device 12 comprises a male connector 14 and a resistor array 17, wherein the third pin 16c and the fourth pin 16d are connected to resistor of the resistor array 17, voltage level or floating. When the peripheral device 12 connects to the electronic device 11, the voltage levels of the GPIO1 and GPIO2 of the controlling unit 15 may be changed according to the connections between the third pin 16c and the resistor array 17 and between the fourth pin 16d and the resistor array 17. When the peripheral device 12 connects to the electronic device 11, the controlling unit 15 reads the voltage levels of the GPIO1 and GPIO2 so as to acquire a first state. Then, after a predetermined time period, the controlling unit 15 sets the GPIO1 to operate at an output mode, i.e., setting the voltage of the GPIO1 to a high voltage level or logic "1", and sets the GPIO2 to operate at an input mode. After a later time period, the controlling unit 15 reads the voltage levels of the GPIO1 and GPIO2 so as to read a second state. In this embodiment, the controlling unit 15 reads the voltage level of the GPIO1 via GPIO3, and reads the voltage level of the GPIO2 via GPIO4.

In this embodiment, each of the first state and the second state comprises 2 bits of data. Therefore, the controlling unit 15 can combine the bits of the first state and the second state to generate a 4 bit identification data, and identifies the peripheral device 12 according to the identification data.

In another embodiment, after reading the second state for a second predetermined time period, the controlling unit 15 sets the GPIO2 to operate at an output mode, i.e., setting the voltage of the GPIO2 to a high voltage level, and sets the GPIO1 to operate at an input mode. After a later time period, the controlling unit 15 reads the voltage levels of the GPIO1 and GPIO2 so as to read a third state. In this embodiment, similarly, the controlling unit 15 reads the voltage level of the GPIO1 via GPIO3, and reads the voltage level of the GPIO2 via GPIO4.

The controlling unit 15 then can combine the bits of the first state, the second state and the third state to generate a 6 bit identification data, and identifies the peripheral device 12 according to the identification data.

It is noted that, in this embodiment, the controlling unit 15 sets the GPIO1 or GPIO2 to operate at an output mode by setting the voltage of the GPIO1 or GPIO2 to a high voltage level. However, those skilled in the art can understand that the voltage of the GPIO1 or GPIO2 can be set to a low voltage level or logic "0", and the corresponding second state and third state of the GPIO1 and GPIO2 can be read to identify the peripheral device 12.

Figure 2:
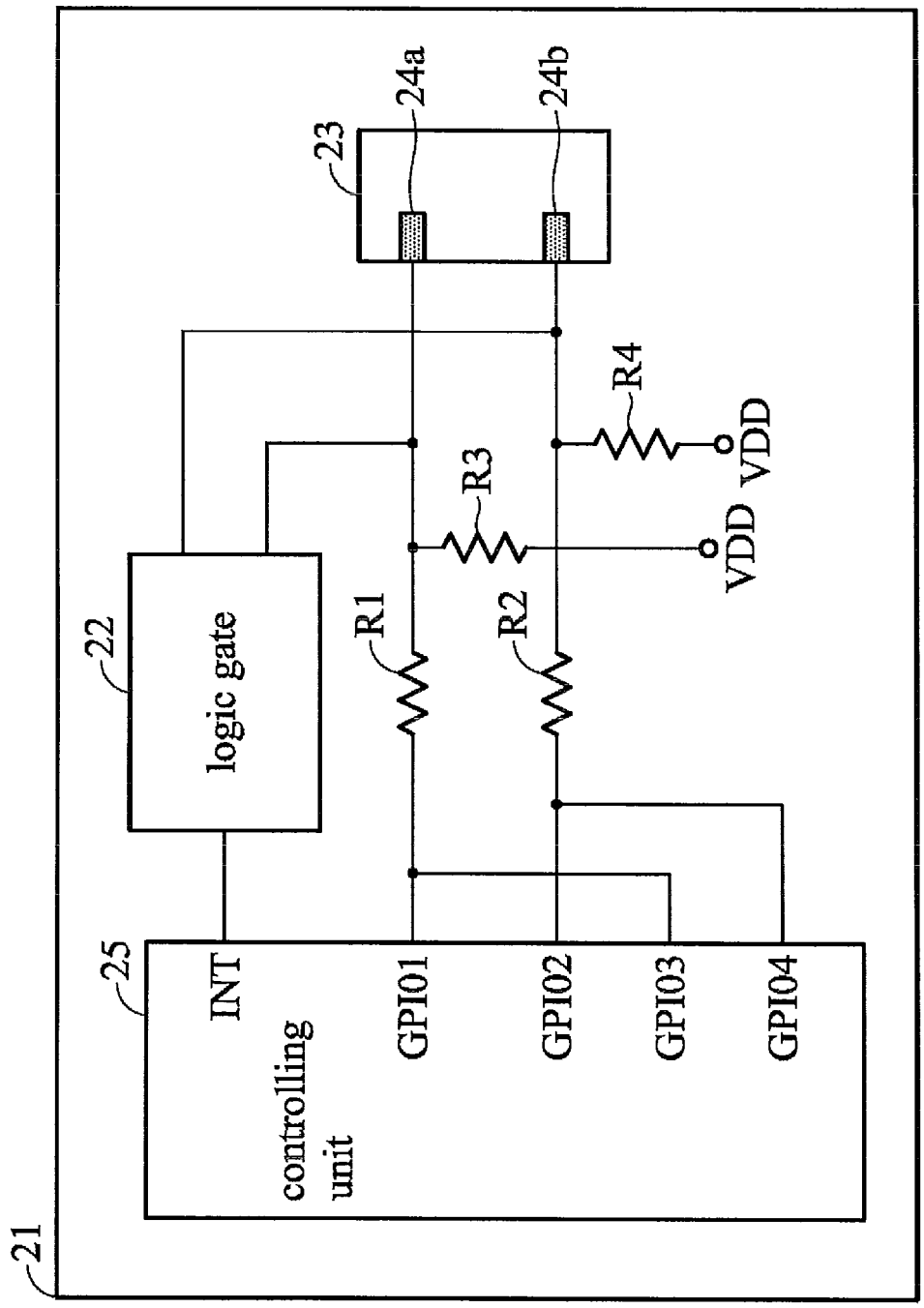
FIG. 2 is a schematic diagram of an embodiment of an electronic device capable of automatically identifying a peripheral device according to the present invention.

FIG. 2 is a schematic diagram of an embodiment of an electronic device capable of automatically identifying a peripheral device according to the present invention. Compared with the electronic device 11 of FIG. 1, the electronic device 21 includes a logic gate 22 and an interrupt pin INT of the controlling unit 25. The logic gate 22 comprises two input terminals respectively coupled to the first pin 24a and the second pin 24b, and an output terminal coupled to the interrupt pin INT of the controlling unit 25. In this embodiment, if the initial state of the first pin 24a and the second pin 24b is [11], the logic gate 22 is an AND gate. When the peripheral device connects to the electronic device 21 via the female connector 23, at least one voltage of the first pin 24a and the second pin 24b will be pulled down to a low voltage level, i.e., logic level "0", and the output of the logic gate 22 is changed to a logic level "0" from a logic level "1".

The controlling unit 25 can trigger an interrupt and execute a peripheral procedure to identify the peripheral devices by means of software or firmware design when the logic level of the interrupt pin INT is changed to a logic level "0" from a logic level "1". The peripheral procedure is similar to the description of FIG. 1, and only discussed briefly here. When the controlling unit 25 receives the interrupt, the controlling unit 25 operates like the controlling unit 15 in FIG. 1 and successively reads the voltage levels of the GPIO1 and GPIO2 twice via the GPIO3 and GPIO4 so as to read a first state and a second state. The controlling unit 25 then combines the bits of the first state and the second state to obtain a 4 bit identification data to identify the peripheral device. Alternatively, when the controlling unit 25 receives the interrupt, the controlling unit 25 can successively read the voltage levels of the GPIO1 and GPIO2 three times via the GPIO3 and GPIO4 so as to read a first state, a second state and a third state. Then, the controlling unit 25 combines the bits of the first state, the second state, and the third state to obtain a 6 bit identification data to identify which peripheral device is connected.

It is noted that, in this embodiment, when the GPIO1 or GPIO2 is at an output mode, the controlling unit 25 reads the voltage levels of the GPIO1 and GPIO2 by reading the voltage levels of the GPIO3 and GPIO4. However, since the voltage level of the pin which is at the output mode is fixed, the controlling unit 25 can only read the voltage level of the pin which is not at the output mode and combine the voltage level of the pin at the output mode to generate the state of the GPIO1 and GPIO2. For example, in this embodiment, since the GPIO1 is at the output mode and the voltage of the GPIO1 is high voltage level, i.e., logic level "1", the controlling unit 25 can only read the voltage level of the GPIO2. If the voltage of the GPIO2 is a low voltage level, i.e., logic level "0", the controlling unit 25 can determine that the state of the GPIO1 and GPIO2 is [10]. If the voltage of the GPIO2 is a high voltage level, i.e., logic level "1", the controlling unit 25 can determine that the state of the GPIO1 and GPIO2 is [11].

In FIG. 2, if the initial state of the GPIO1 and GPIO2 is [00], the logic gate 22 is an OR gate. When the peripheral device connects to the electronic device 21 via the female connector 23, at least one voltage of the first pin 24a and the second pin 24b will be pulled up to a high voltage level, i.e., logic level "1", and the output of the logic gate 22 is changed to a logic level "1" from a logic level "0".

The controlling unit 25 can trigger an interrupt and execute a peripheral procedure to identify the peripheral devices by means of software or firmware design when the logic level of the interrupt pin INT is changed to a logic level "1" from a logic level "0". The peripheral procedure is similar to the above description and not discuss here for brevity. Furthermore, in another embodiment, a GPIO pin with interrupt function may also be used to detect whether an interrupt has occurred.

Figure 3:
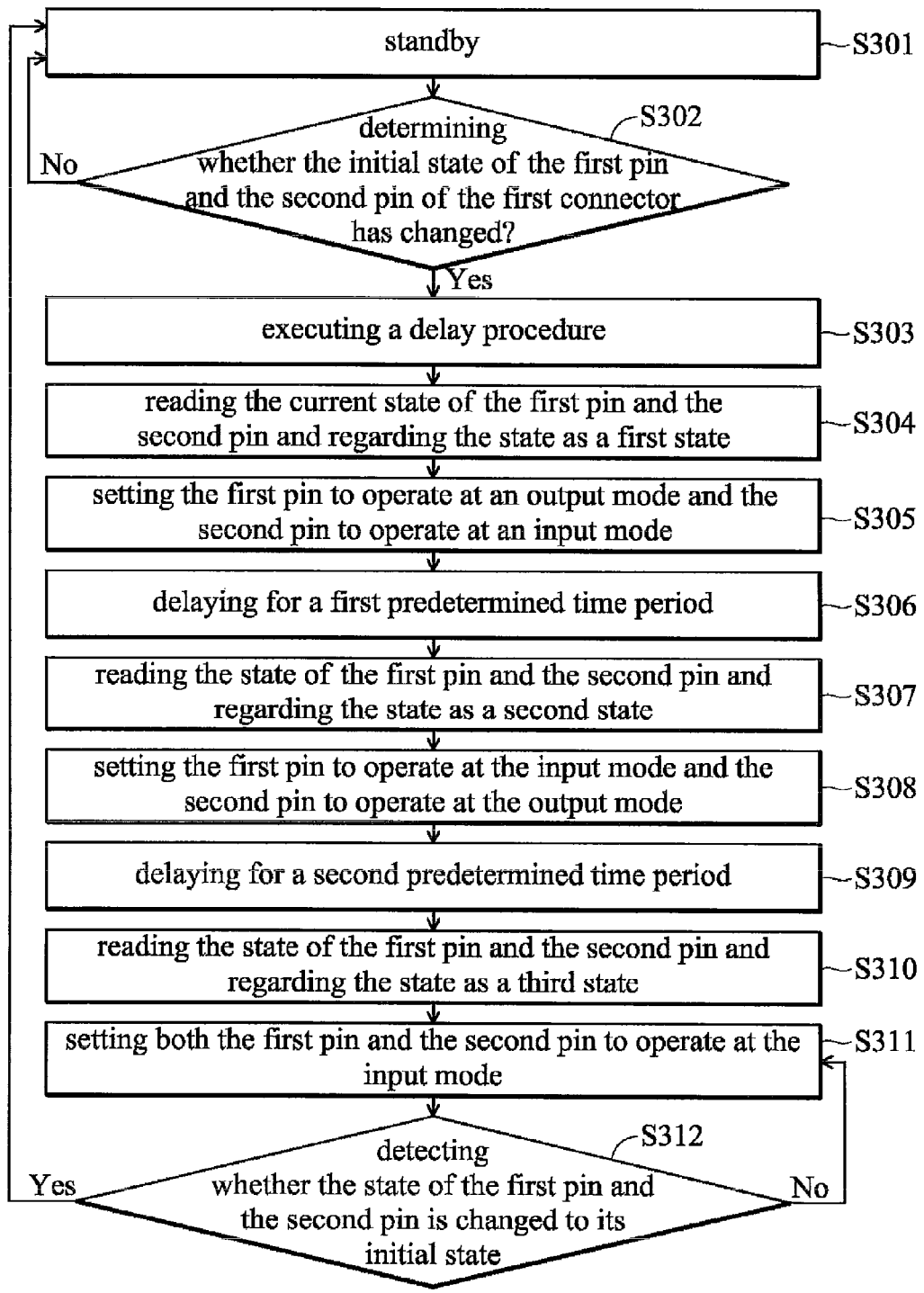
FIG. 3 is a flowchart of a method for identifying a peripheral device according to one embodiment of the invention.

FIG. 3 is a flowchart of a method for identifying a peripheral device according to one embodiment of the present invention. The method is applied to an electronic device and a peripheral device, wherein the electronic device comprises a first connector with a first pin and a second pin, and the peripheral device comprises a second connector with a third pin corresponding to the first pin and a fourth pin corresponding to the second pin.

The flowchart is illustrated below.

Step S301: The electronic device is at standby mode.

Step S302: The electronic device determines whether a peripheral device is connected to the first connector by determining whether the initial state of the first pin and the second pin of the first connector has changed. If yes, the procedure goes to step S303, and if not, the procedure returns to step S301.

Step S303: The electronic device executes a delay procedure, that is, when it is determined that a peripheral device is connected to the first connector of the electronic device, the delay procedure is executed to delay for a predetermined time period to avoid an unstable signal caused upon connecting the first connector to the second connector.

Step S304: The electronic device reads the state of the first pin and the second pin and regards the state as a first state.

Step S305: The electronic device sets the first pin to operate at an output mode and the second pin to operate at an input mode.

Step S306: The electronic device delays the procedure for a first predetermined time period, wherein in this embodiment, the first predetermined time period is 10 ms.

Step S307: The electronic device reads the state of the first pin and the second pin and regards the state as a second state.

Step S308: The electronic device sets the first pin to operate at the input mode and the second pin to operate at the output mode.

Step S309: The electronic device delays the procedure for a second predetermined time period, wherein in this embodiment, the second predetermined time period is 10 ms.

Step S310: The electronic device reads the state of the first pin and the second pin and regards the state as a third state.

Step S311: The electronic device sets both the first pin and the second pin to operate at the input mode, and determines what kind of peripheral device is connected according to an identification data combined by the bits of the first state, the second state and the third state.

Step S312: The electronic device detects whether the state of the first pin and the second pin is changed to its initial state. If yes, it indicates that the peripheral device is not connected to the electronic device, and the procedure returns to step S301 and the electronic device is set to stay at a standby mode. If no, it indicates that the peripheral device keep being connected to the electronic device, and the procedure enters to step S311 or another loop.

FIGS. 4a to 4f show the schematic diagrams of embodiments of connectors of the peripheral device according to the present invention. In FIGS. 4a to 4f, only the connections between the male connector 31 of the peripheral device and the resistor array are discussed. By grounding or floating the pins 32a and 32b or connecting the pins 32a and 32b to resistors, the peripheral device can provide different identification data to the electronic device. In the embodiments, the male connector 31 is illustrated with its connection to the female connector 13 of the electronic device 11 in FIG. 1 and the identification data is illustrated with a 6 bit identification data.

Figure 4A:
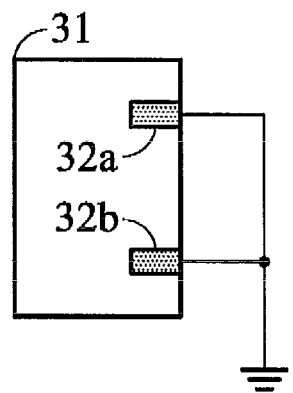
FIGS. 4a to 4f show the schematic diagrams of embodiments of connectors of the peripheral device according to the present invention.

In FIG. 4a, the pins 32a and 32b of the male connector 31 are grounded. Therefore, when the male connector 31 connects to the female connector 13, the first pin 16a is electrically connected to the pin 32a, and the second pin 16b is electrically connected to pin 32b so that the voltages of the GPIO1 and GPIO2 are pulled down to a ground voltage level. After the male connector 31 is connected to the female connector 13 for a delay time, the controlling unit 15 reads the voltage levels of the GPIO1 and GPIO2 so as to read a first state [IO1_1, IO2_1], which is [00]. Then, the controlling unit 15 sets the GPIO1 to operate at an output mode, i.e. setting the voltage of the GPIO1 to a high voltage level, and sets the GPIO2 to operate at an input mode. After a first predetermined time period, the controlling unit 15 reads the voltage levels of the GPIO1 and GPIO2 so as to read a second state [IO1_2, IO2_2], which is [00]. Since the pin 32a is grounded, the voltage of the GPIO1 remains at a ground voltage level even though the controlling unit 15 sets the voltage of the GPIO1 to a high voltage level. Afterward, the controlling unit 15 sets the GPIO2 to operate at the output mode, i.e. setting the voltage of the GPIO2 to a high voltage level, and sets the GPIO1 to operate at the input mode. After a second predetermined time period, the controlling unit 15 reads the voltage levels of the GPIO1 and GPIO2 so as to read a third state [IO1_3, IO2_3], which is [00]. Since the pin 32b is grounded, the voltage of the GPIO2 remains at a ground voltage level even though the controlling unit 15 sets the voltage of the GPIO2 to a high voltage level.

The controlling unit 15 combines the bits of the first state, the second state and the third state to generate a 6 bit identification data, [000000]. If the female connector 31 in FIG. 4a is the connector of an earphone, the controlling unit 15 can receive the 6 bit identification data [000000] and identify the peripheral device 12 connecting to the electronic device 11 as the earphone according to the 6 bit identification data.

Figure 4B:
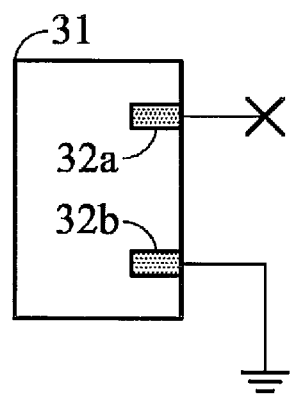

In FIG. 4b, the pin 32a is not connected to any resistor or voltage level and pin 32b is grounded. Therefore, when the male connector 31 connects to the female connector 13, the first pin 16a is electrically connected to the pin 32a, and the second pin 16b is electrically connected to pin 32b so that the voltage of the GPIO2 is pulled down to a ground voltage level. After the male connector 31 is connected to the female connector 13 for a delay time, the controlling unit 15 reads the voltage levels of the GPIO1 and GPIO2 so as to read a first state [IO1_1, IO2_1], which is [10]. Then, the controlling unit 15 sets the GPIO1 to operate at an output mode, i.e., setting the voltage of the GPIO1 to a high voltage level, and sets the GPIO2 to operate at an input mode. After a first predetermined time period, the controlling unit 15 reads the voltage levels of the GPIO1 and GPIO2 so as to read a second state [IO1_2, IO2_2], which is [10]. Then, the controlling unit 15 sets the GPIO2 to operate at the output mode, i.e., setting the voltage of the GPIO2 to a high voltage level, and sets the GPIO1 to operate at the input mode. After a second predetermined time period, the controlling unit 15 reads the voltage levels of the GPIO1 and GPIO2 so as to read a third state [IO1_3, IO2_3], which is [10]. Since the pin 32b is grounded, the voltage of the GPIO2 remains at a ground voltage level even though the controlling unit 15 sets the voltage of the GPIO2 to a high voltage level.

The controlling unit 15 combines the bits of the first state, the second state and the third state to generate a 6 bit identification data, [101010]. If the female connector 31 in FIG. 4b is the connector of a speaker, the controlling unit 15 can receive the 6 bit identification data [101010] and identify the peripheral device 12 connecting to the electronic device 11 as the speaker according to the 6 bit identification data.

Figure 4C:
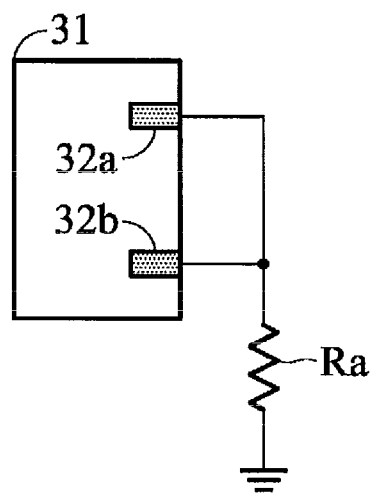

In FIG. 4c, the pins 32a and 32b of the male connector 31 are grounded via the resistor Ra. Therefore, when the male connector 31 connects to the female connector 13, the first pin 16a is electrically connected to the pin 32a, and the second pin 16b is electrically connected to pin 32b so that the voltages of the GPIO1 and GPIO2 are pulled down to a ground voltage level. In this embodiment, the resistance of the resistor Ra is 10KΩ. After the male connector 31 is connected to the female connector 13 for a delay time, the controlling unit 15 reads the voltage levels of the GPIO1 and GPIO2 so as to read a first state [IO1_1, IO2_1], which is [00]. Then, the controlling unit 15 sets the GPIO1 to operate at an output mode, i.e., setting the voltage of the GPIO1 to a high voltage level, and sets the GPIO2 to operate at an input mode. After a first predetermined time period, the controlling unit 15 reads the voltage levels of the GPIO1 and GPIO2 so as to read a second state [IO1_2, IO2_2], which is [11]. Then, the controlling unit 15 sets the GPIO2 to operate at the output mode, i.e., setting the voltage of the GPIO2 to a high voltage level, and sets the GPIO1 to operate at an input mode. After a second predetermined time period, the controlling unit 15 reads the voltage levels of the GPIO1 and GPIO2 so as to read a third state [IO1_3, IO2_3], which is [11].

The controlling unit 15 combines the bits of the first state, the second state and the third state to generate a 6 bit identification data, [001111]. If the female connector 31 in FIG. 4c is the connector of a charger, the controlling unit 15 can receive the 6 bit identification data [001111] and identify the peripheral device 12 connecting to the electronic device 11 as the charger according to the 6 bit identification data.

Figure 4D:
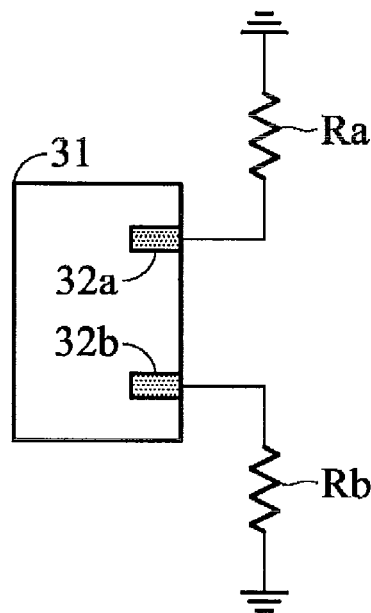

In FIG. 4d, the pins 32a and 32b of the male connector 31 are grounded respectively via resistors Ra and Rb. Therefore, when the male connector 31 connects to the female connector 13, the first pin 16a is electrically connected to the pin 32a, and the second pin 16b is electrically connected to pin 32b so that the voltages of the GPIO1 and GPIO2 are pulled down to a ground voltage level. In this embodiment, both the resistances of the resistors Ra and Rb are 10KΩ. After the male connector 31 is connected to the female connector 13 for a delay time, the controlling unit 15 reads the voltage levels of the GPIO1 and GPIO2 so as to read a first state [IO1_1, IO2_1], which is [00]. Then, the controlling unit 15 sets the GPIO1 to operate at an output mode, i.e., setting the voltage of the GPIO1 to a high voltage level, and sets the GPIO2 to operate at an input mode. After a first predetermined time period, the controlling unit 15 reads the voltage levels of the GPIO1 and GPIO2 so as to read a second state [IO1_2, IO2_2], which is [10]. Then, the controlling unit 15 sets the GPIO2 to operate at the output mode, i.e., setting the voltage of the GPIO2 to a high voltage level, and sets the GPIO1 to operate at the input mode. After a second predetermined time period, the controlling unit 15 reads the voltage levels of the GPIO1 and GPIO2 so as to read a third state [IO1_3, IO2_3], which is [01].

The controlling unit 15 combines the bits of the first state, the second state and the third state to generate a 6 bit identification data, [001001]. If the female connector 31 in FIG. 4d is the connector of a microphone, the controlling unit 15 can receive the 6 bit identification data [001001] and identify the peripheral device 12 connecting to the electronic device 11 as the microphone according to the 6 bit identification data.

Figure 4E:
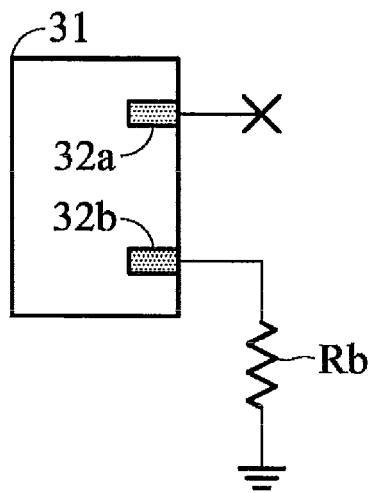

In FIG. 4e, the pin 32a is not connected to any resistor or voltage level and the pin 32b is grounded via a resistor Rb. Therefore, when the male connector 31 connects to the female connector 13, the first pin 16a is electrically connected to the pin 32a, and the second pin 16b is electrically connected to pin 32b so that the voltage of the GPIO2 is pulled down to a ground voltage level. In this embodiment, the resistance of the resistor Rb is 10KΩ. After the male connector 31 is connected to the female connector 13 for a delay time, the controlling unit 15 reads the voltage levels of the GPIO1 and GPIO2 so as to read a first state [IO1_1, IO2_1], which is [10]. Then, the controlling unit 15 sets the GPIO1 to operate at an output mode, i.e., setting the voltage of the GPIO1 to a high voltage level, and sets the GPIO2 to operate at an input mode. After a first predetermined time period, the controlling unit 15 reads the voltage levels of the GPIO1 and GPIO2 so as to read a second state [IO1_2, IO2_2], which is [10]. Then, the controlling unit 15 sets the GPIO2 to operate at the output mode, i.e., setting the voltage of the GPIO2 to a high voltage level, and sets the GPIO1 to operate at the input mode. After a second predetermined time period, the controlling unit 15 reads the voltage levels of the GPIO1 and GPIO2 so as to read a third state [IO1_3, IO2_3], which is [11].

The controlling unit 15 combines the bits of the first state, the second state and the third state to generate a 6 bit identification data, [101011]. If the female connector 31 in FIG. 4e is the connector of a line-controlled earphone, the controlling unit 15 can receive the 6 bit identification data [101011] and identify the peripheral device 12 connecting to the electronic device 11 as the line-controlled earphone according to the 6 bit identification data.

Figure 4F:
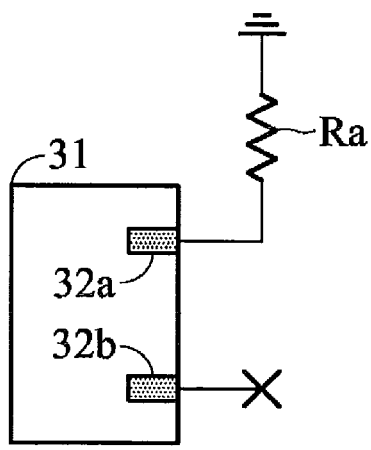

In FIG. 4f, the pin 32b is not connected to any resistor or voltage level and the pin 32a is grounded via a resistor Ra. Therefore, when the male connector 31 connects to the female connector 13, the first pin 16a is electrically connected to the pin 32a, and the second pin 16b is electrically connected to pin 32b so that the voltage of the GPIO1 is pulled down to a ground voltage level. In this embodiment, the resistance of the resistor Ra is 10KΩ. After the male connector 31 is connected to the female connector 13 for a delay time, the controlling unit 15 reads the voltage levels of the GPIO1 and GPIO2 so as to read a first state [IO1_1, IO2_1], which is [01]. Then, the controlling unit 15 sets the GPIO1 to operate at an output mode, i.e., setting the voltage of the GPIO1 to a high voltage level, and sets the GPIO2 to operate at an input mode. After a first predetermined time period, the controlling unit 15 reads the voltage levels of the GPIO1 and GPIO2 so as to read a second state [IO1_2, IO2_2], which is [11]. Then, the controlling unit 15 sets the GPIO2 to operate at the output mode, i.e., setting the voltage of the GPIO2 to a high voltage level, and sets the GPIO1 to operate at the input mode. After a second predetermined time period, the controlling unit 15 reads the voltage levels of the GPIO1 and GPIO2 so as to read a third state [IO1_3, IO2_3], which is [01].

The controlling unit 15 combines the bits of the first state, the second state and the third state to generate a 6 bit identification data, [011101]. If the female connector 31 in FIG. 4f is the connector of a global positioning system (GPS) device, the controlling unit 15 can receive the 6 bit identification data [011101] and identify the peripheral device 12 connecting to the electronic device 11 as the GPS device according to the 6 bit identification data.

FIG. 5 is a table showing identification data with corresponding devices shown in FIGS. 4a to 4f. By using the resistor array shown in FIG. 1, two pins can be used to identify more than 4 peripheral devices. Although the embodiments of the present invention are illustrated with two pins, those skilled in the art can apply the described with three or more pins.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for an electronic device for automatically detecting and identifying a peripheral device, the electronic device comprising a connector having a first pin and a second pin and connecting to the peripheral device through the connector, the method comprising:
   determining whether the peripheral device is connected to the connector;

reading a first set of at least two bits of data of the first pin and the second pin, which corresponds to a first state, when determining that the peripheral device is connected to the connector;

setting a voltage of the first pin to a first voltage, which corresponds to an output mode, after reading the first set of at least two bits of data, and then, after delaying for a predetermined time period, reading a second set of at least two bits of data of the first pin and the second pin, which corresponds to a second state; and identifying a type of the peripheral device according to at least four bits of identification data, which corresponds to the first and second states, generated by processing the first and second sets of at least two bits of data.

2. The method as claimed in claim 1, further comprising:
setting a voltage of the second pin to a second voltage level and then reading a third set of at least two bits of data of the first pin and the second pin; and wherein the step of identifying the type of the peripheral device according to the at least four bits of identification data generated by processing the first and second sets of at least two bits of data further comprises:

identifying the type of the peripheral device according to at least six bits of identification data generated by processing the first, second and third sets of at least two bits of data.

3. The method as claimed in claim 2, between the steps of reading the third set of at least two bits of data and setting a voltage of the second pin, further comprising:
delaying for a predetermined time period.

4. The method as claimed in claim 1, wherein the step of determining whether the peripheral device is connected to the connector further comprises:
detecting an initial state of the first pin and the second pin to determine whether the peripheral device is connected to the connector.

5. An electronic device capable of automatically detecting and identifying a peripheral device, comprising: a controller; and a connector comprising a first pin and a second pin coupled to the controller, wherein when the connector is connected to the peripheral device, the controller reads a first set of at least two bits of data of the first pin and the second pin, which corresponds to a first state, and when the controller finishes reading the first set of at least two bits of data, the controller sets a voltage of the first pin to a first voltage level, which corresponds to an output mode, then reads a second set of at least two bits of data of the first pin and the second pin, which corresponds to a second state, and identifies a type of the peripheral device according to at least four bits of identification data, corresponding to the first and second states, generated by processing the first and second sets of at least two bits of data.

6. The device as claimed in claim 3, wherein the first pin is coupled to a first voltage level via a first resistor and to the controller via a second resistor, and the second pin is coupled to the first voltage level via a third resistor and to the controller via a fourth resistor.

7. The device as claimed in claim 5, wherein when the controller finishes reading the second set of at least two bits of data, the controller sets a voltage of the second pin to a second voltage level and then reads a third set of at least two bits of data of the first pin and the second pin.

8. The device as claimed in claim 7, wherein the controller identifies the type of the peripheral device according to at least six bits of identification data generated by processing the first, second and third sets of at least two bits of data.

9. The device as claimed in claim 5, further comprising:
a logic gate comprising two input terminals respectively coupled to the first pin and the second pin, and an output terminal for generating and transmitting an interrupt signal to the controller according to voltage levels of the first pin and the second pin.

10. The device as claimed in claim 9, wherein when the connector is connected to the peripheral device, the logic gate generates the interrupt signal according to the voltages levels of the first pin and the second pin; and when the controller receives the interrupt signal, the controller starts reading the first set of at least two bits of data of the first pin and the second pin.

11. An electronic system, comprising: a peripheral device comprising a third pin and a fourth pin; and an electronic device comprising: a controller; and a connector comprising a first pin and a second pin coupled to the controller, wherein the electronic device is connected to the peripheral device via the connector; wherein when the electronic device is coupled to the peripheral device, the first pin and the second pin are respectively coupled to the third pin and the fourth pin, and the controller reads a first set of at least two bits of data of the first pin and the second pin, which corresponds to a first state; and when the controller finishes reading the first set of at least two bits of data, the controller sets a voltage of the first pin to a first voltage level, which corresponds to an output mode, then reads a second set of at least two bits of data of the first pin and the second pin, which corresponds to a second state, and identifies a type of the peripheral device according to at least four bits of identification data, corresponding to the first and second states, generated by processing the first and second sets of at least two bits of data.

12. The system as claimed in claim 11, wherein the first pin is coupled to a first voltage level via a first resistor and to the controller via a second resistor, and the second pin is coupled to the first voltage level via a third resistor and to the controller via a fourth resistor.

13. The system as claimed in claim 11, wherein when the controller finishes reading the second set of at least two bits of data, the controller sets a voltage of the second pin to a second voltage level and then reads a third set of at least two bits of data of the first pin and the second pin; wherein the controller identifies the type of the peripheral device according to at least six bits of identification data generated by processing the first, second and third sets of at least two bits of data.

14. The system as claimed in claim 11, further comprising:
a logic gate comprising two input terminals respectively coupled to the first pin and the second pin, and an output terminal for generating and transmitting an interrupt signal to the controller according to voltage levels of the first pin and the second pin.

15. The device as claimed in claim 14, wherein when the connector is connected to the peripheral device, and the logic gate generates the interrupt signal according to the voltages levels of the first pin and the second pin; and when the controller receives the interrupt signal, the controller starts reading the first set of at least two bits of data of the first pin and the second pin.

* * * * *